United States Patent

[11] 3,624,764

| [72] | Inventor | Kenneth W. Goben<br>Vienna, Va. |
|---|---|---|
| [21] | Appl. No. | 36,722 |
| [22] | Filed | May 13, 1970 |
| [45] | Patented | Nov. 30, 1971 |
| [73] | Assignee | The United States of America as represented by the Secretary of the Navy |

[54] VIBRATION ISOLATION MOUNT AND SHOCK ABSORBER
2 Claims, 2 Drawing Figs.

[52] U.S. Cl. .................................................. 188/1 C, 267/22 R
[51] Int. Cl. ...................................................... F16f 7/12
[50] Field of Search........................................... 188/1 B, 1 C; 248/21; 267/22 R, 81, 83, 85

[56] References Cited
UNITED STATES PATENTS

| 2,998,214 | 8/1961 | Peterman........................ | 188/1 C X |
| 3,082,846 | 3/1963 | Jensen et al. .................. | 188/1 C |
| 3,130,819 | 4/1964 | Marshall........................ | 188/1 C |
| 3,144,228 | 8/1964 | Kass............................... | 267/81 X |
| 3,265,163 | 8/1966 | Gilbert et al.................. | 188/1 C X |
| 3,437,332 | 4/1969 | Lee ............................... | 267/22 X |

Primary Examiner—Duane A. Reger
Attorneys—R. S. Sciascia and Q. E. Hodges

ABSTRACT: An elastomer vibration or sound attenuating material isolates two elastic-plastic spring shock absorbers. Expected operational sound or vibrational loads are essentially absorbed by the elastomer and for these loads the device acts as a low-frequency isolation mount. For mechanical shock forces beyond limits of sound or vibration the elastic-plastic springs responsively deform thereby absorbing and attenuating the shock force transmitted through it.

DISPLACEMENT BETWEEN PLATE 11 & PLATE 19

INVENTOR.
KENNETH W. GOBEN
BY
*O.E. Hodges*
ATTORNEY

VIBRATION ISOLATION MOUNT AND SHOCK ABSORBER

The invention described herein may be manufactured and used by or for the government of the United States of America for governmental purposes without the payment of any royalties thereon or therefor.

BACKGROUND AND SUMMARY OF THE INVENTION

Vibration isolation mounts utilizing resilient materials have a limited degree of deformation. When loads are applied to a resilient mount beyond its absorption capability and its physical deformation limit the mount bottoms resulting in snubbing or collision and subjecting the equipment to higher acceleration forces than would be experienced directly from the initial vibration force. Shock mounts utilizing elastic-plastic springs, less flexible than vibration isolation material isolate the equipment from shock forces but cannot isolate the equipment from the smaller sound or vibration forces. This device combines a flexible vibration isolation mount with a stiffer shock absorbing mount in a manner which allows the shock absorber and the vibration isolation portions to function independently and which in combination satisfies the conflicting requirements of vibration and shock.

The shock absorber and vibration isolation mount includes two metal cylinders made of crushable expanded metal having the nature of elastic-plastic springs. These cylinders are isolated from each other by a resilient elastomer. The elastomer is placed physically between the two elastic-plastic springs and is deformed by small amplitudes of vibration thereby absorbing vibration forces. For these vibration forces there is negligible deformation of the stiffer elastic-plastic springs. However, when the deformation limit of the elastomer is reached the force is transferred to the elastic-plastic springs. The springs then absorb the heavier shock force and insulate the protected load.

Accordingly, it is one object of this invention to provide an effective vibration isolation and shock mount.

A second object of this invention is to provide a vibration isolation independently of the associated shock mount.

A third object of the invention is to provide a shock mount which independently attenuates shock forces beyond the limits of vibration and which is essentially inactive for small amplitudes of vibration displacements.

BRIEF DESCRIPTION OF THE DRAWINGS

Referring now to FIG. 1 wherein a shock absorber and vibration isolation mount 10 is shown having an end plate 11 for mounting the protected loads and a hollow cylinder 13 made of mesh expanded metal and attached to the mounting end plate 11 at one end. A hollow cylinder 15 of an elastomer material concentric with the inner cylinder 13, completely surrounds the inner cylinder 13 and is integrally attached to it throughout the common surface area 14. An outer cylinder 17 is concentric with the inner cylinder 13 and the elastomer 15 and is integral with the elastomer 15 throughout the common surface area 16. A foundation end plate 19 for attaching the mount to the force transmitter is integrally attached to the outer cylinder 17 at the opposite end from end plate 11.

Figure 1:
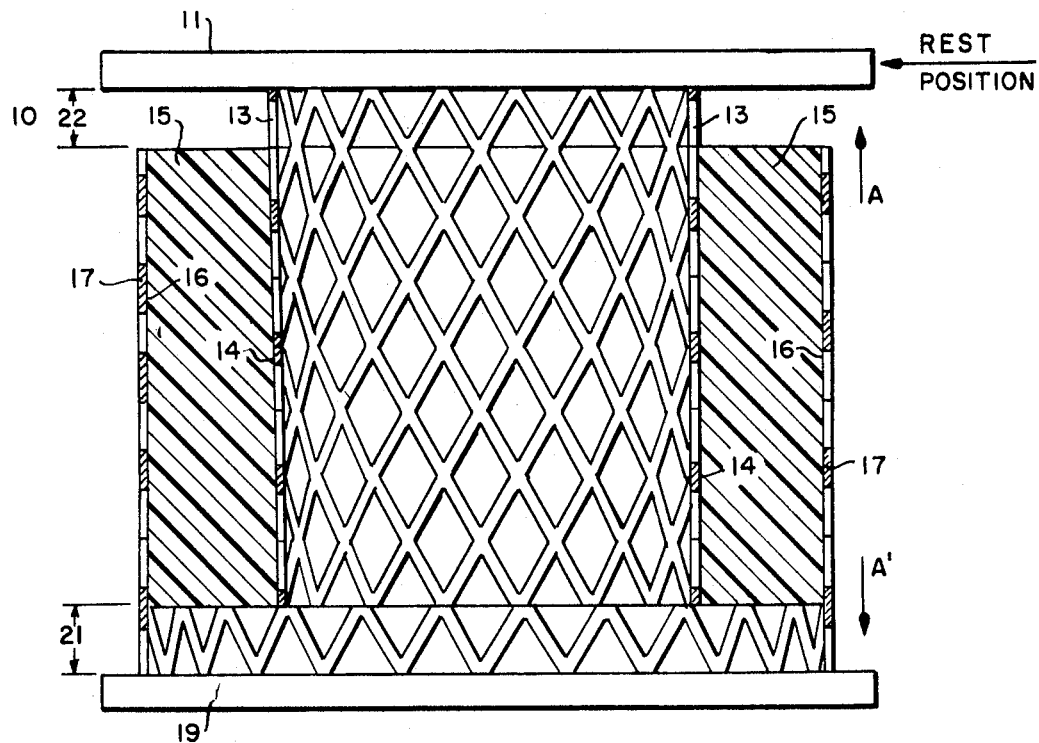
FIG. 1 shows a cross section view taken through the centerline of the shock absorber and vibration isolation mount.

The inner and outer cylinders 13 and 17 are positioned so at rest and in the absence of any shock or vibration force there is a space 21 between the inner cylinder 13 and the foundation plate 19 and between end plate 11 and outer cylinder 17, there is a space 22 and the foundation plate 19 to allow limited physical displacement of the inner cylinder in the direction A' for small amplitudes of vibration. Similarly, the protected load should be mounted so that limited displacement of cylinder 13 in the direction of arrow A is unrestricted. Cylinders 13 and 17 can be made from any suitable mesh expanded metal, an example of which is shown in U.S. Pat. No. 3,373,629, issued on Mar. 19, 1968, to R. D. Wight et al. The elastomer can be any commercially available viscoelastic material having a modulus of elasticity substantially less than that of the crushable cylinders. The end plate 11 and foundation plate 19 may physically attached to the crushable cylinders by welding or by any other suitable technique.

The mount can be made by arranging the inner and outer cylinders 13 and 17 within a mold and pouring the elastomer while in a plastic state into the space between the cylinders so that a portion of the elastomer flows into the open spaces of the mesh material and holds cylinders 13 and 17 integrally with the elastomer 15 after the material cools and is solid. Alternatively, the elastomer can be premolded and cemented to the crushable cylinders using epoxy or any other suitable cement.

Figure 2:
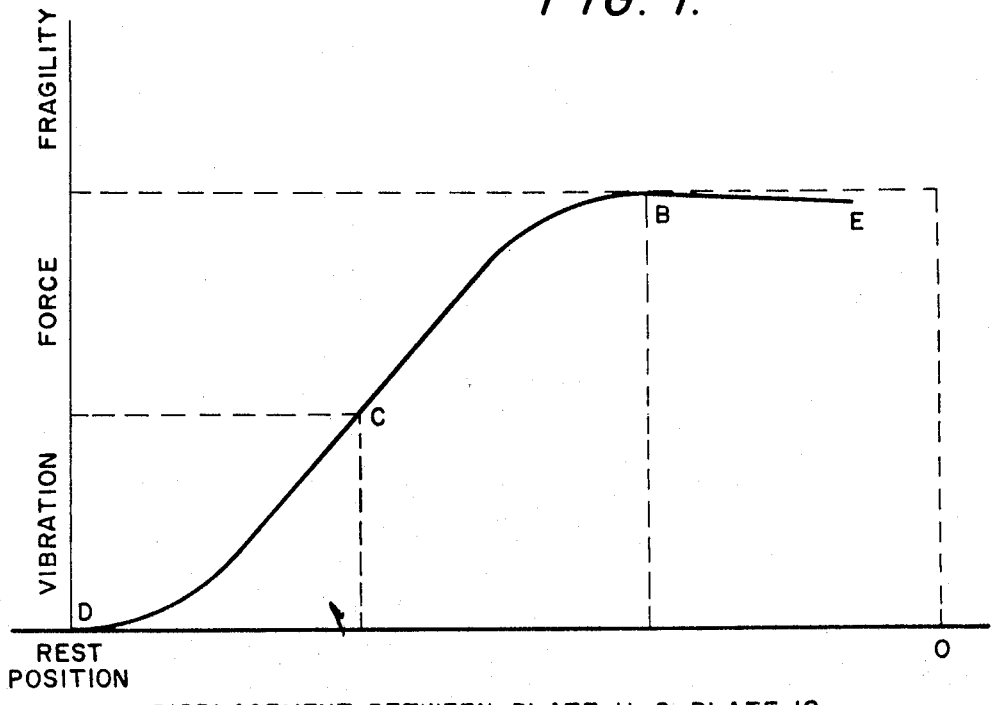
FIG. 2 is a graph showing relative displacement of the mount's end plates for given force levels.

Referring now to FIG. 2, the graphical representation of end plate 11 displacement relative to the foundation plate 19, as a function of shock is shown. Under a vibration force of small amplitude, inner cylinder 13 is displaced relative to outer cylinder 17 placing the elastomer in shear. The elastomer is substantially more flexible than the crushable expanded metal cylinders and is easily stretched in shear thereby absorbing the vibration force. The cylinders, being stiff in comparison to the elastomer, remain essentially undeformed and are displaced relative to each other in the direction A or A' depending on the direction of the applied force.

When a force within the sound or vibration range and in direction A is applied, the elastomer deforms responsively as shown by curve section B–C, absorbing the applied forces. The relative displacement of the end plate and the foundation plate is decreased as cylinder 13 and end plate 11 is forced toward plate 19 in response to the applied force.

When a force in shock range and in the direction A is applied, the inner cylinder is displaced to the foundation 19 where further displacements of the inner cylinder is prevented. The elastomer is rendered inactive by the stop and cannot further absorb any of the applied force. The shock force then acting on the device elastically deforms the cylinder in compression, as shown by curve section C–D.

For a force beyond the elastic or fragility limit, the cylinders undergo a nonelastic-plastic deformation, operatively absorbing the force while collapsing, as shown by curve section D–E.

The elastomer should have a modulus of elasticity in shear so that inner cylinder 13 is displaced from a rest position into contact with foundation 19 by the maximum expected sound or vibration force. The cylinders 13 and 17 should have a modulus of elasticity in compression so that the maximum vibration or sound force causes a negligible amount of elastic deformation in the cylinders and so that shock forces greater than the sound or vibration forces cause sufficient elastic deformation in the cylinders to absorb the expected shock force. The fragility limit of the cylinders should be chosen to be substantially equal to the maximum expected shock force so that the cylinder will collapse absorbing the force and decreasing its effect upon the protected load.

It should be recognized that this preferred embodiment can be varied and does not represent the totality of the invention.

What is claimed is:

1. A vibration isolation and shock-absorbing mount having individual elements separately reacting to vibration forces and shock forces, the shock forces being larger in magnitude than the vibration forces, comprising:
    vibration isolation means;
    a plurality of shock-absorbing means;
    said shock-absorbing means being connected to each other by said vibration isolation means whereby a vibration force having a predetermined maximum amplitude displaces said shock-absorbing means relative to each other;
    stop means limiting the displacement of said shock absorber means when a shock force of a magnitude greater than said maximum vibration force displaces said shock absorber means against said stop means whereby further absorption of energy by said vibration isolation means is prevented;

said shock-absorbing means being deformed by the said shock force of a magnitude greater than said maximum vibration force thereby absorbing said shock force;

said shock absorber and vibration mount having a central axis;

said shock absorber means including at least two spaced-apart cylinders concentric with said central axis; and said space between said cylinders being filled with a viscoelastic material attached to each of said cylinders.

2. The shock absorber of claim 1 wherein said shock absorber means is crushable expanded metal.

* * * * *